United States Patent
Ruohola et al.

(10) Patent No.: US 6,178,898 B1
(45) Date of Patent: Jan. 30, 2001

(54) RECOVERY BOILER

(75) Inventors: Tuomo Ruohola; Matti Salmela, both of Tampere (FI)

(73) Assignee: Kvaerner Pulping Oy, Tampere (FI)

(*) Notice: Under 35 U.S.C. 154(b), the term of this patent shall be extended for 0 days.

(21) Appl. No.: 09/024,331

(22) Filed: Feb. 17, 1998

(30) Foreign Application Priority Data

Feb. 25, 1997 (FI) ........................................ 970791

(51) Int. Cl.[7] .......................... F22B 37/10; F22B 37/00; F23M 5/00
(52) U.S. Cl. .................. 110/234; 110/238; 110/313; 110/336; 122/6 A; 422/185
(58) Field of Search .......................... 110/234, 238, 110/313, 314, 336, 337; 122/1 C, 8, 9, 6 A; 162/31; 422/185

(56) References Cited

U.S. PATENT DOCUMENTS

| 2,238,007 | * | 4/1941 | Badenhausen . | |
| 2,305,611 | * | 12/1942 | Frisch | 122/6 A |
| 2,960,390 | * | 11/1960 | Hochmuth . | |
| 3,215,099 | * | 11/1965 | Coulter, Jr. | 110/234 |
| 3,477,823 | * | 11/1969 | Freiday | 110/234 |
| 3,545,409 | * | 12/1970 | Young | 122/6 A |
| 4,175,519 | * | 11/1979 | Pratt et al. | 122/6 A X |
| 4,325,328 | * | 4/1982 | Miszak | 122/6 A |
| 4,454,839 | * | 6/1984 | Gater et al. | 122/6 A X |
| 4,479,536 | * | 10/1984 | Lameris | 165/145 |
| 4,502,397 | * | 3/1985 | Hochmuth | 110/346 |
| 4,823,710 | * | 4/1989 | Garrido et al. | 110/234 |
| 5,730,071 | * | 3/1998 | Wasyluk et al. | 110/322 |
| 5,836,257 | * | 11/1998 | Belin et al. | 110/245 |

FOREIGN PATENT DOCUMENTS

| 23814 | 2/1950 | (FI) . |
| 29505 | 6/1958 | (FI) . |

* cited by examiner

Primary Examiner—Ira S. Lazarus
Assistant Examiner—Ljiljana V. Ciric
(74) Attorney, Agent, or Firm—Rockey, Milnamow & Katz, Ltd.

(57) ABSTRACT

In a recovery boiler for burning spent liquor of a pulp mill, a combustion chamber has heat transfer walls formed of tubes, at least one vertical heat transfer surface formed of tubes, and superheaters in an upper part of the combustion chamber for recovering heat generated by combustion and for cooling flue gases. The at least one vertical heat transfer surface divides the combustion chamber in a transverse direction into two combustion spaces.

6 Claims, 3 Drawing Sheets

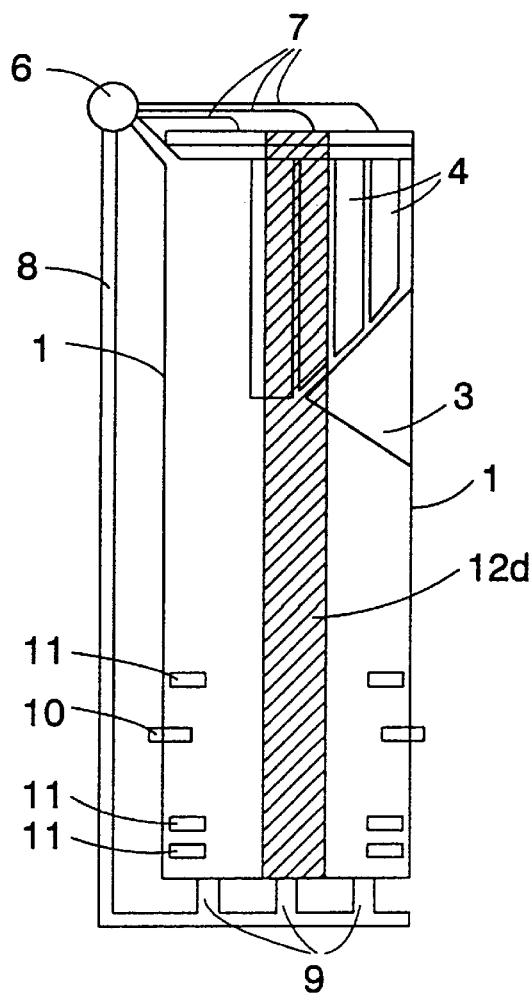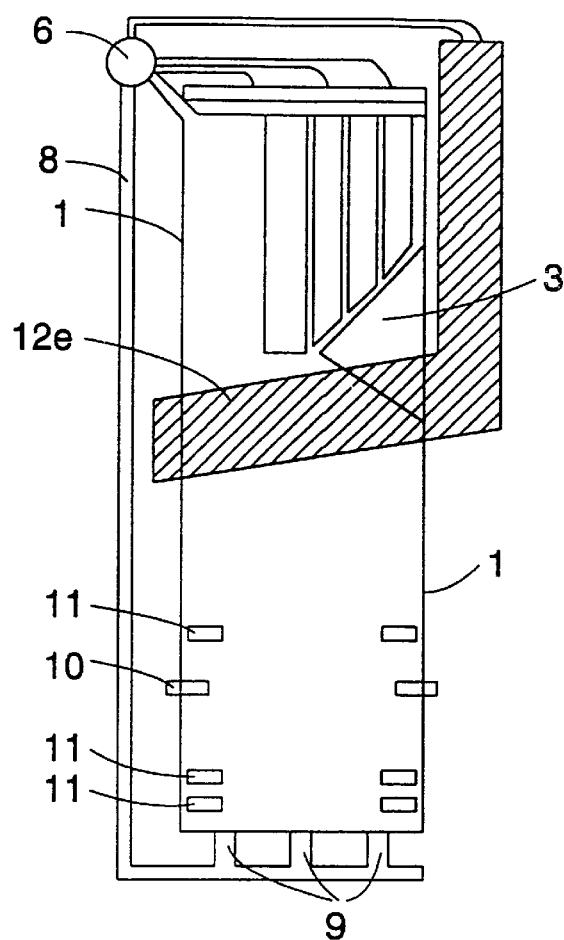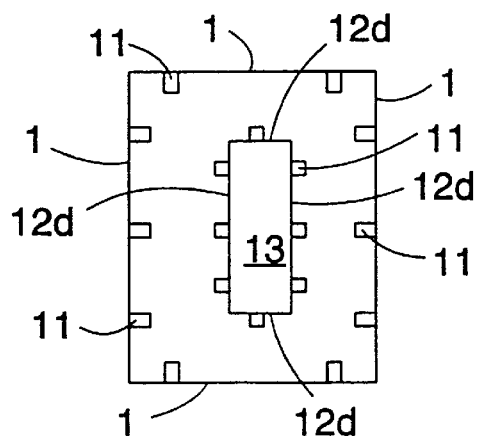
FIG. 4a
FIG. 5
FIG. 4b

RECOVERY BOILER

FIELD OF THE INVENTION

The invention relates to a recovery boiler for burning spent liquor of a pulp mill, the recovery boiler comprising a combustion chamber surrounded by heat transfer surfaces constituted by walls formed of tubes, into which combustion chamber the spent liquor to be burned and combustion air are fed, the upper part of the combustion chamber comprising superheaters for recovering the heat generated by the combustion and for cooling flue gases.

The spent liquor of a pulp mill is fed into a recovery boiler to be burned therein so that, firstly, heat energy and, secondly, chemicals are recovered therefrom, which can be recycled to the process of the pulp mill. The heat energy generated at the combustion in the combustion chamber is recovered by utilizing heat transfer surfaces, in which is circulating either water or steam, depending on the location Part of the heat transfer surfaces are tight walls formed of tubes by welding and surrounding the combustion chamber and part of the heat transfer surfaces are different kinds of heat recovery units formed of tubes, which units are known as superheaters and are positioned as screen tubes in the upper part of the recovery boiler, in the upper part of the very combustion chamber, and from there forward in a flue gas channel and possibly across the combustion chamber. The different heat transfer surfaces are mutually connected to a water and steam circulation in such a way that the cold water to be fed into the recovery boiler warms up and then vaporizes so that high-pressure steam superheated in the heat transfer surfaces serving as superheaters is generated for suitable purposes.

For making the recovery boiler corrosion-resistant enough and, on the other hand, for recovering the heat energy of the flue gases as well as possible, the flue gases shall be cooled to a sufficiently low temperature. The present recovery boilers are planned according to the above principle.

BACKGROUND OF THE INVENTION

For the operation of the recovery boiler, it is very important that gaseous bodies in the combustion chamber, such as the fed combustion air and the fuel, can be mixed and the fuel can be burned as well as possible so that combustion reactions are mainly over before the flue gases arrive at the upper part of the combustion chamber, between densely located heat transfer surfaces, i.e. superheaters. The fact is that the mixing of gases is prevented or retarded between densely located heat transfer surfaces and the vicinity of surfaces colder than gases stops or retards reactions, though the temperature of the gases otherwise were sufficient for the implementation of the reactions. On account of this, a predetermined retention time in the combustion chamber is necessary, within which time the reacting substances can be evenly mixed. This retention time can generally be caused by increasing the height of the combustion chamber. A problem with big recovery boilers is that even mixing is insufficient within the whole cross-section of the combustion chamber, and it is difficult to adjust the operation conditions of the recovery boiler and the feed of various substances and gases needed for the process. A further problem is that if the flow rate of the gases in the boiler is high, fuel drops try to follow the gas flow and, accordingly, the combustion increases in the upper part of the boiler and causes both corrosion and scaling of the heat transfer surfaces.

With growing effect of the boiler and with accordingly growing size of the combustion chamber, it is necessary to increase the number of cooling surfaces, because the flue gases have to be cooled to a predetermined temperature. From this follows that the bottom area of the boiler and the volume of the combustion chamber increase remarkably when the height grows.

Moreover, the growing cross-section and the accordingly growing height of boilers require higher buildings, and so the construction costs increase in this respect considerably. In addition, because the recovery boiler is suspended from its brackets, a big and heavy char bed on the bottom of the boiler causes a remarkable additional weight load, which still complicates the dimensioning and constructing of the boiler. Further, it is inconvenient and complicated to feed a sufficient amount of air in such a way that the combustion conditions can be made as efficient as possible.

BRIEF SUMMARY OF THE INVENTION

The object of this invention is to provide a recovery boiler, which is easier to control as the known recovery boiler construction and which makes the recovery of heat energy more efficient, so that it is not necessary to increase the height of the boiler significantly in spite of growing effect. The recovery boiler according to the invention is characterised in that the combustion chamber comprises at least one vertical heat transfer surface formed of tubes, by means of which surface heat generated by combustion is recovered, and which surface divides the combustion chamber in its transverse direction, so that the breadth of the combustion space at said heat transfer surface between this surface and the wall of the combustion chamber is smaller than the distance between the walls of the combustion chamber of the recovery boiler in the same direction.

The essential idea of the invention is that heat transfer surfaces mounted in the combustion chamber of a recovery boiler divide the combustion chamber into combustion spaces having a breadth smaller than the distance between the walls of the boiler, into which combustion spaces air and fuel can easily be fed in a controlled manner and in which spaces the substances participating in the process can be mixed and thus burned sufficiently well and efficiently in the lower part of the recovery boiler already, before the gases arrive at the densely located heat transfer surfaces, such as superheaters. An advantage of the invention is that, the combustion spaces being narrower than the whole breadth of the combustion chamber of the recovery boiler, both the feed of fuel, i.e. spent liquor, and the air feed and phasing of the air feed are easier to carry out in such a way that the substances participating in the combustion process can be well intermixed. By means of these heat transfer surfaces, the heat generated at the first end of the combustion process is also easy to recover, whereby the gases cool faster and the retention time in the boiler can be kept shorter than in a boiler constituted by a combustion chamber having an integral cross-section. Moreover, the cooling medium of these heat transfer surfaces can be kept as an entirely separate circulation, if desired, which makes it possible to use other than water as cooling medium, though it is also possible to connect the surfaces to the rest of the water circulation of the heat transfer surfaces.

BRIEF DESCRIPTION OF THE SEVERAL VIEWS OF THE DRAWING

The invention is described in greater detail in the attached drawings, in which

FIGS. 4a and 4b show a schematic sectional view of a third embodiment of the recovery boiler of the invention as in FIG. 1a from the side in the vertical direction and along line IV—IV of FIG. 4a in the horizontal direction, respectively, and FIG. 5 shows a schematic sectional view of a fourth embodiment of the recovery boiler of the invention from the side in the vertical direction.

DETAILED DESCRIPTION OF THE INVENTION

Figures 1A, 2A:
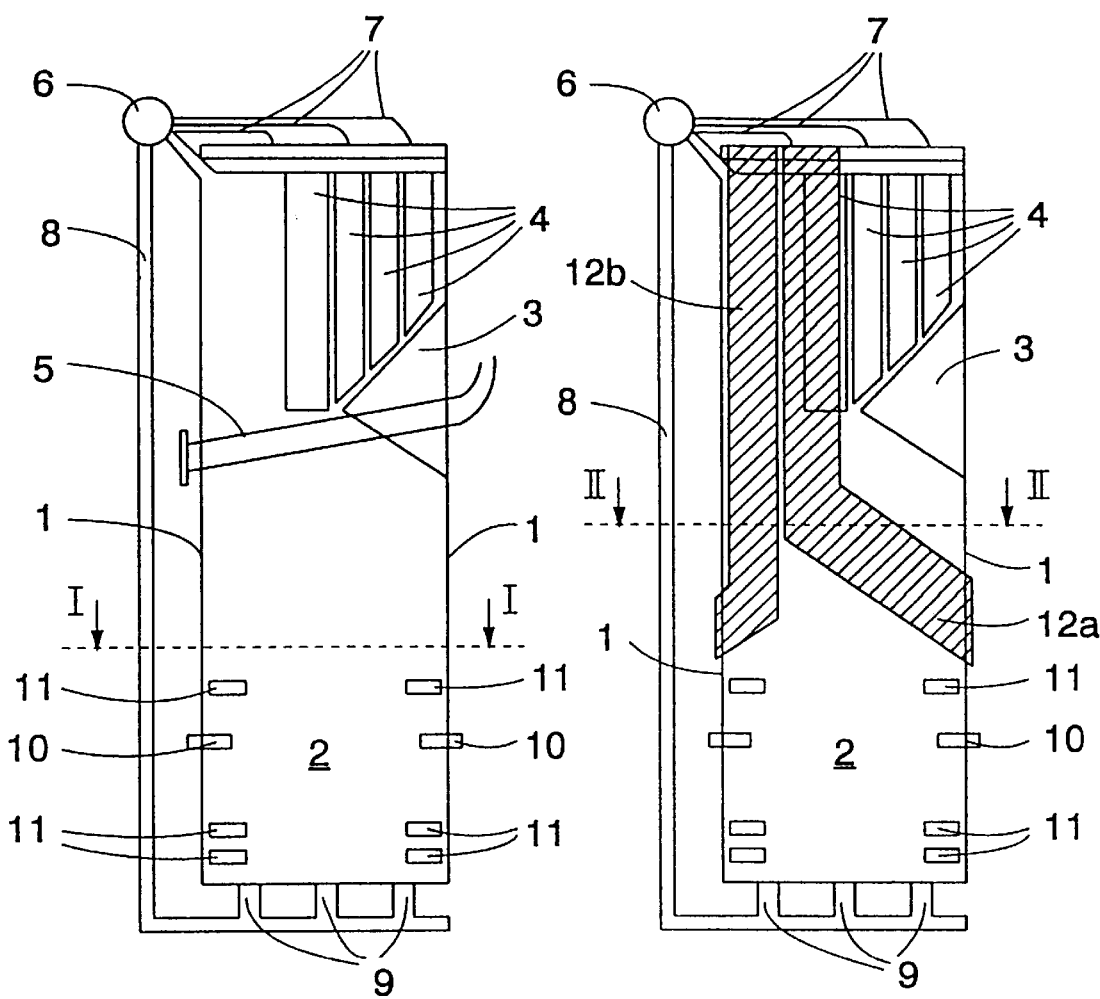
FIGS. 1a and 1b show a sectional view of a known conventional recovery boiler from the side in the vertical direction and along line I—I of FIG. 1a in the horizontal direction, respectively.
FIGS. 2a and 2b show a sectional view of a first embodiment of a recovery boiler of the invention as in FIG. 1a from the side in the vertical direction and along line II—II of FIG. 2a in the horizontal direction, respectively.
Figures 1B, 2B:
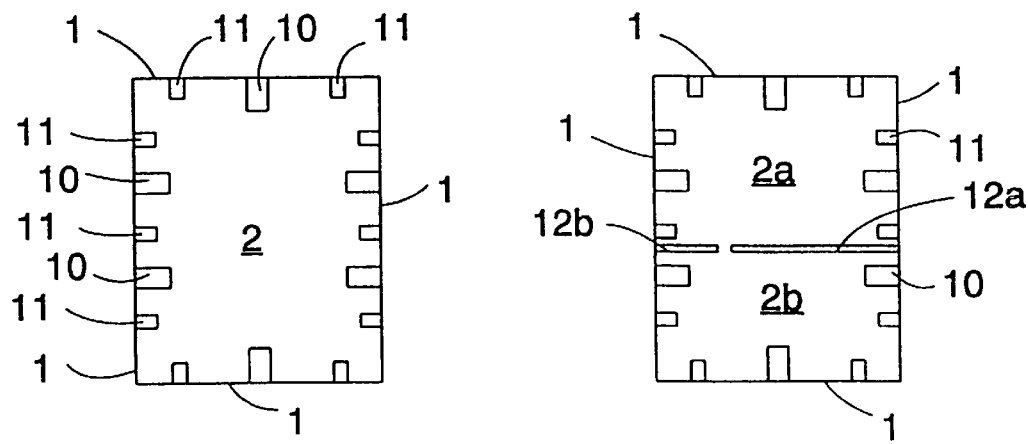

FIGS. 1a and 1b show a schematic sectional view of a conventional recovery boiler according to the prior art from the side in the vertical direction and along line I—I of FIG. 1a in the horizontal direction, respectively. In all figures, the same numerals are used for the same components and they are not specified separately later, if it is not necessary for clarifying the figure in question. The recovery boiler is constituted by walls 1 formed of tubes by welding in a manner known per se, between which walls remains a combustion chamber 2. The upper part of the combustion chamber 2 has a nose arch 3, by which the flow of flue gases is guided. Above the nose arch 3, there are superheaters 4 formed of tubes, the steam flowing therein being heated by hot flue gases outside the tubes. Below the superheaters 4, at the nose arch 3 of the recovery boiler, there may also be screen tubes 5, positioned relatively far apart from each other and cooling the gases which flow from the combustion chamber to the superheaters 4. The superheaters 4 are connected by means of upper circulating tubes 7 to one cylinder, or in some cases several cylinders 6, usually located on the recovery boiler. On the other hand, descent tubes 8 lead from the cylinder 6 to lower circulating tubes 9 in the lower part of the recovery boiler. The walls 1, superheaters 4 and screen tubes 5 of the boiler are known as heat transfer surfaces. These are either tubes situated apart from each other or walls formed of tubes by welding, in which flows water or steam heated by the effect of the combustion taking place outside the heat transfer surfaces or by the effect of hot gases. In this patent, both in the description and the claims, the term "heat transfer surface" signifies a wall-type construction formed of tubes, which construction is either an integral solid wall or a tube construction having slits between the separate tubes.

Further, the walls 1 of the recovery boiler comprise feed nozzles 10, by means of which the spent liquor of a pulp mill is fed into the recovery boiler for combustion. Additionally, the walls of the recovery boiler have air nozzles 11, by means of which the air needed for the combustion is fed into the recovery boiler. The air feed can take place in many different ways and at several different places in the height direction of the recovery boiler so that a desired combustion can be caused. Tube connections of different kinds, water and steam circulation and the feed of spent liquor and air belong to a technique generally known and obvious to one skilled in the art and, therefore, it is not considered relevant to describe them here any further.

As appears from FIG. 1b, the cross-section of the recovery boiler is in this situation a uniform rectangle. In several cases, the spent liquor fed from the walls towards the middle of the combustion chamber and the combustion air mix rather badly, which makes the combustion uneven. Further, the propagation of the combustion in the height direction of the recovery boiler is uneven and difficult to control. This is a special problem when the dimensions of the cross-section of the recovery boiler are large, up to nearby 15 meters.

FIGS. 2a and 2b show schematically a recovery boiler, the construction and operation of which correspond to the FIGS. 1a and 1b, as in FIG. 1 in cross-section in the vertical direction and in section along line II—II of FIG. 2a in the horizontal direction. From FIG. 2a is seen how two heat transfer surfaces 12a and 12b made of tubes and forming a wall are mounted in the recovery boiler. The heat transfer surfaces 12a and 12b are formed in such a way that they extend a distance from above fuel nozzles 11 up to the ceiling of the combustion chamber of the recovery boiler and constitute an integral wall surface dividing the combustion chamber into separate combustion spaces 2a and 2b. From FIG. 2b appears how the heat transfer surfaces 12a and 12b divide the combustion chamber along line II—II of FIG. 2a into the two separate combustion spaces 2a and 2b, which in this case are substantially equal in size. The heat transfer surfaces 12a and 12b are formed of tubes so that water and/or steam flowing through the other heat transfer surfaces can be led in a desired manner through those tubes for heat recovery, the heat transfer surfaces 12a and 12b being connected to a cylinder 6 for providing the flow desired. Alternatively, the heat transfer surfaces 12a and 12b can be arranged to form closed circulations entirely separate from the other heat transfer surfaces, whereby some other heat transfer medium can be used in them and the heat obtained this way can be recovered in a desired manner by means of heat exchangers, for instance.

Figure 3A:
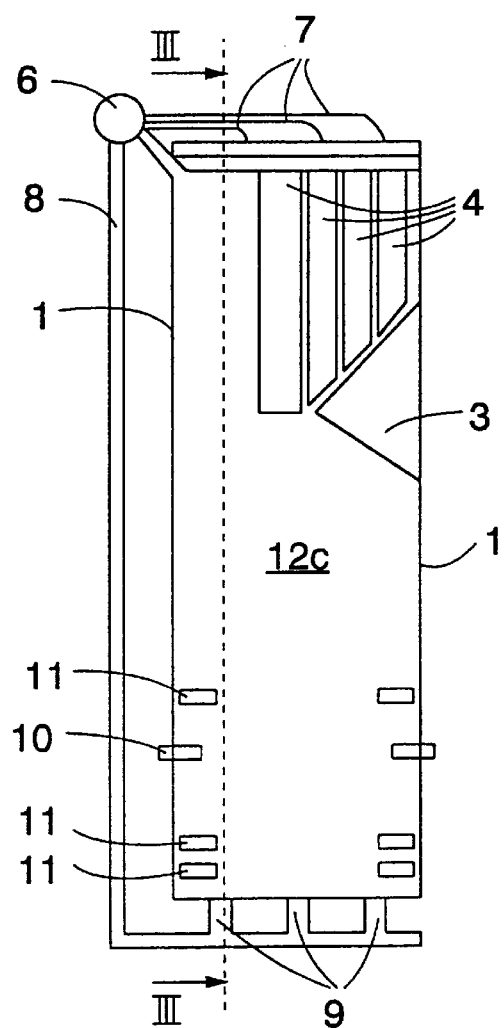
FIGS. 3a and 3b show a schematic sectional view of a second embodiment of the recovery boiler of the invention as in FIG. 1a from the side in the vertical direction and along line III—III of FIG. 3a in the vertical direction, respectively.
Figure 3B:
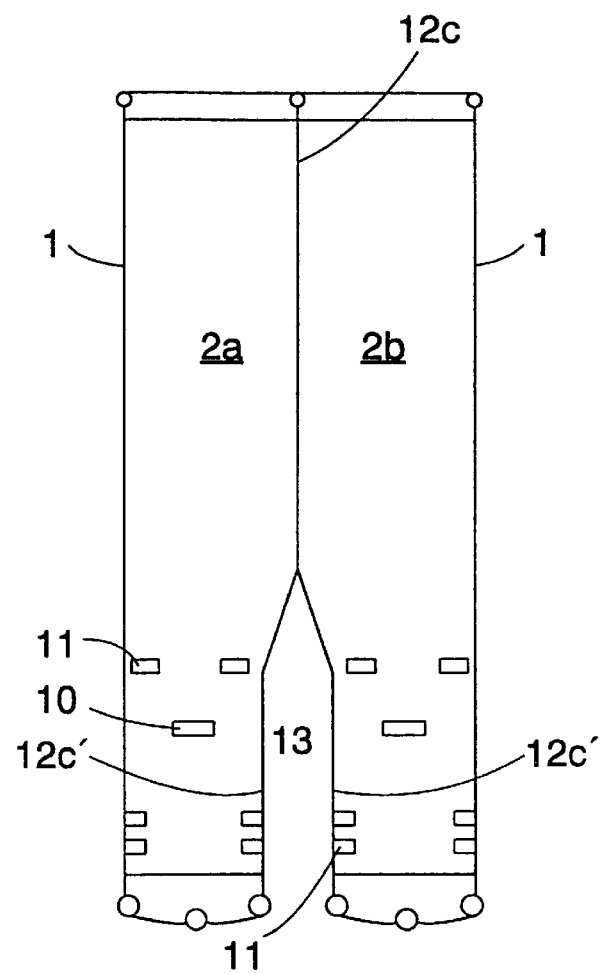

FIGS. 3a and 3b again show a second embodiment of the recovery boiler of the invention. In this embodiment, the recovery boiler looks from the side like the one in FIG. 1a. In the middle of it, there is, however, a heat transfer surface 12c constituting a wall and extending from the ceiling of the combustion chamber 2 to the bottom of the combustion chamber 2. From FIG. 3b is seen how this has been realized in this case. The lower part of the heat transfer surface 12 is divided according to FIG. 3b into two mutually parallel parts 12c' of the heat transfer surface, between which parts remains a slit-like space connected to the environment of the recovery boiler. Thus the heat transfer surface 12c12c' divides the recovery boiler into two combustion spaces 2a and 2b being entirely separate from each other in the lower part of the boiler and extending up to the upper part of the boiler, whereby each combustion space is easy to adjust both with respect to the fuel and to the air feed and, correspondingly, the substances participating in the combustion process can be mixed efficiently and the combustion takes place perfectly before superheaters 4. It is possible to feed both air and fuel from the space 13 between the heat transfer surfaces 12c' through the heat transfer surface 12c' into the combustion spaces 2a and 2b of the combustion chamber of the recovery boiler in order to make the combustion process easy to control. The heat transfer surface 12c may also extend integrally along the entire height of the recovery boiler from the ceiling of the combustion chamber to its bottom, but in the situation of FIG. 3b, the combustion in the separate combustion chambers is easier to adjust thanks to additional air nozzles, for instance. Further, the heat transfer surface 12c constituting a wall can also be formed above the parallel parts 12c' of the heat transfer surface in such a way that a slit remains between the tubes forming the wall. This does not essentially influence the operation and adjustments of the recovery boiler, because mainly the same conditions prevail in both combustion spaces and a small gas flow between the combustion spaces does not disturb the combustion process substantially.

FIGS. 4a and 4b show, in turn, a third embodiment of the recovery boiler of the invention. FIG. 4a shows a cross-sectional side view of the recovery boiler in the height direction, in the same way as FIG. 1a does. In this embodiment, a heat transfer surface 12d constituting a wall is provided as a channel 13 extending from the ceiling of the combustion chamber of the recovery boiler to its bottom, which appears more clearly from FIG. 4b. In this embodiment, the channel-like heat transfer surface 12d causes a ring-shaped combustion space in the recovery boiler, the breadth of the space between the walls 1 of the recovery boiler and the channel-like heat transfer surface 12d in the middle being smaller than the distance between the walls 1 of the recovery 35 boiler in the corresponding direction. In this embodiment, air needed for the combustion can be fed for instance by using the channel remaining in the middle of the channel-like heat transfer surface 12d and nozzles mounted in the heat transfer surface through said heat transfer surface from the inside channel into the combustion chamber. Such air feed nozzles may appear in a desired manner on several different levels in the height direction of the channel-like heat transfer surface and, in the same way, fuel nozzles can be mounted through the surface for feeding spent liquor into the ring-shaped combustion space.

Moreover, FIG. 5 shows a fourth embodiment of the recovery boiler of the invention. FIG. 5 shows a cross-sectional side view of the recovery boiler in the height direction in the same way as FIG. 1a does. In this application, a heat transfer surface 12e constituted by an additional wall or additional walls dividing the combustion chamber comprises heat transfer surfaces extending from the front wall of the boiler through the rear wall and ascending further in the flue gas channel behind the rear wall. The heat transfer surface 12e extends in the combustion chamber in the vertical direction from above the feeding point close to the lower edge of superheaters. In the combustion chamber, the heat transfer walls are so far from each other and from the side walls of the combustion chamber that empty space fit for combustion reactions remains between them. The ascending parts behind the rear wall are situated in an already colder flue gas flow behind the superheaters, and therefore, they can be brought laterally closer to each other for intensifying convective heat transfer.

The invention has been described above in the specification and in the drawings by way of example only and it has not in any way been restricted to that. Essential is that one additional heat transfer surface or several such surfaces formed of tubes and constituting a wall have been mounted in the combustion chamber of the recovery boiler, the heat transfer surface dividing the combustion chamber in such a way that the combustion space remaining on both sides of the combustion chamber has a smaller breadth than the distance between the walls 1 of the combustion chamber seen in the same direction. This division of the combustion chamber can be implemented either in the space above the fuel feed nozzles, for instance, whereby the additional heat transfer surfaces constituting a wall extend preferably substantially up to the ceiling of the combustion chamber. Or it may be implemented by dividing the combustion chamber beginning nearly from the bottom or right from the bottom or in a desired manner from between those two. It is essential that the main part of the combustion can be made to take place in the parallel combustion spaces of the combustion chamber divided in this way, so that the fuel and the other substances participating in the combustion are mixed and the combustion reactions take place as completely as possible in the area of the combustion chamber divided into several combustion spaces, while as much heat as possible can be recovered from them by means of the additional heat transfer surfaces for cooling the flue gases efficiently enough.

What is claimed is:

1. A recovery boiler for burning spent liquor of a pulp mill, the recovery boiler comprising a combustion chamber, said combustion chamber having heat transfer walls which are formed of tubes and which surround a combustion space, said combustion chamber having at least one vertical heat transfer surface which is formed of tubes, said combustion chamber having an upper part, a lower part, combustion air feeding points and at least one spent liquor feeding point;

said upper part of said chamber having superheaters for recovering heat generated by combustion and for cooling flue gases, said superheaters having lower edges;

said at least one vertical heat transfer surface being adapted for recovering surface heat generated by combustion, said at least one vertical heat transfer surface dividing said combustion chamber transversely to form at least a first combustion space and a second combustion space adjacent to said first combustion space;

wherein said first combustion space and said second combustion space are each smaller than said combustion space surrounded by said walls, wherein said walls comprise a first wall, a second wall opposite to said first wall, an upper wall and a lower wall, wherein said combustion air feeding points and said at least one spent liquor feeding point are located in said first and second walls, wherein the tubes forming said at least one vertical heat transfer surface extend from said upper wall to said lower wall, and wherein said at least one vertical heat transfer surface has a slit extending from said lower wall.

2. The boiler of claim 1 further comprising additional combustion air feeding points which are air nozzles, and wherein said nozzles extend through said at least one vertical heat transfer surface.

3. The boiler of claim 1 comprising at least two vertical heat transfer surfaces.

4. A recovery boiler for burning spent liquor of a pulp mill, the recovery boiler comprising a combustion chamber, said combustion chamber having heat transfer walls which are formed of tubes and which surround a combustion space, said combustion chamber having at least one vertical heat transfer surface which is formed of tubes, said combustion chamber having an upper part, a lower part, combustion air feeding points and at least one spent liquor feeding point;

said upper part of said chamber having superheaters for recovering heat generated by combustion and for cooling flue gases, said superheaters having lower edges;

said at least one vertical heat transfer surface being adapted for recovering surface heat generated by combustion, said at least one vertical heat transfer surface dividing said combustion chamber transversely to form at least a first combustion space and a second combustion space adjacent to said first combustion space;

wherein said first combustion space and said second combustion space are each smaller than said combustion space surrounded by said walls, wherein said walls comprise a first wall, a second wall opposite to said first wall, an upper wall and a lower wall, wherein said combustion air feeding points and said at least one spent liquor feeding point are located in said first and second walls, wherein said at least one vertical heat transfer surface forms a channel down the middle of the boiler, and wherein said at least one vertical heat transfer surface extends from said upper wall to said lower wall.

5. The boiler of claim 22 further comprising additional combustion air feeding points which are air nozzles located in and extending through said at least one vertical heat transfer surface.

6. The boiler of claim 4 wherein said at least one vertical heat transfer surface extends from said first wall through said second wall, vertically from above said at least one liquor feeding point to said lower edges of said superheaters.

* * * * *

UNITED STATES PATENT AND TRADEMARK OFFICE
CERTIFICATE OF CORRECTION

PATENT NO.: 6,178,898 B 1
DATED : January 30, 2001
INVENTOR(S): Tuomo Ruhola; Matti Salmela It is hereby certified that error appear(s) in the above-identified patent and that said Letters Patent are hereby corrected as shown below:

Column 4, line 10, "nearby" should read -- nearly-- .

Column 5, line 21, "35" should be deleted.

Claim 5, line 1, "22" should read -- 4-- .

Signed and Sealed this

Fifteenth Day of May, 2001

*Attest:*

NICHOLAS P. GODICI

*Attesting Officer*  *Acting Director of the United States Patent and Trademark Office*